Figure 1:
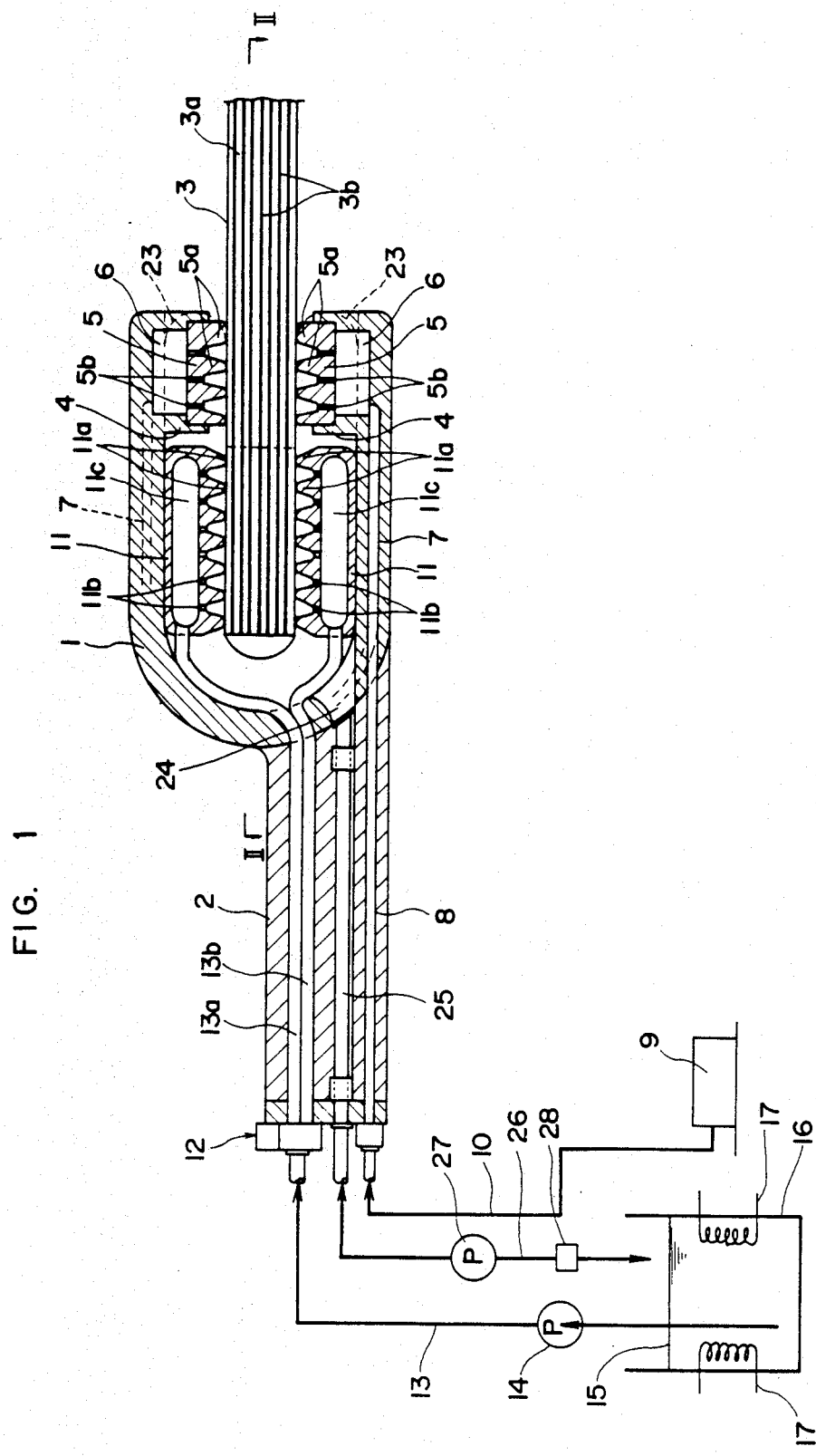

United States Patent [19]
Nishino et al.

[11] Patent Number: 4,709,714
[45] Date of Patent: Dec. 1, 1987

[54] APPARATUS FOR EXPOSING FIBROUS REINFORCEMENTS OF FIBER REINFORCED RESIN BODY

[75] Inventors: Yoshinori Nishino, Yamatotakada; Masahiko Yamamoto, Nishinomiya; Tadayoshi Uda, Izumi; Kiyoshi Kondo, Itami; Yutaka Kondo; Kazuo Kondo, both of Amagasaki, all of Japan

[73] Assignee: Hitachi Zosen Corporation, Japan

[21] Appl. No.: 686,843

[22] Filed: Dec. 27, 1984

[30] Foreign Application Priority Data

Aug. 6, 1984 [JP] Japan .............................. 59-164469
Oct. 25, 1984 [JP] Japan .............................. 59-225433

[51] Int. Cl.$^4$ .......................... B08B 7/00; B08B 7/02
[52] U.S. Cl. ........................................ 134/89; 134/88; 134/90; 134/108; 134/172
[58] Field of Search ............... 134/1, 7, 38, 104, 184, 134/17, 64 R, 16, 122 R, 99, 182, 186, 199, 15, 172, 88-90, 108; 68/DIG. 1, 200

[56] References Cited

U.S. PATENT DOCUMENTS

| 4,187,868 | 2/1980 | Rudolphi | 134/184 |
| 4,193,842 | 3/1980 | Rushing | 134/15 |
| 4,233,496 | 11/1980 | Weber et al. | 134/8 |
| 4,432,380 | 2/1984 | Ruf et al. | 134/104 |
| 4,517,024 | 5/1985 | Gough | 134/64 R |
| 4,591,390 | 5/1986 | Scott et al. | 134/15 |

FOREIGN PATENT DOCUMENTS

| 389849 | 1/1974 | U.S.S.R. | 134/1 |
| 470561 | 8/1975 | U.S.S.R. | 134/1 |

Primary Examiner—Andrew H. Metz
Assistant Examiner—Sharon T. Cohen
Attorney, Agent, or Firm—Barnes, Kisselle, Raisch, Choate, Whittemore & Hulbert

[57] ABSTRACT

An apparatus for exposing the fibrous reinforcements of a fiber reinforced resin body comprises at least one stage in which a portion of the resin body is brought into contact with a heated resin removing liquid while the resin body is vibrated. According to this apparatus subsequent processing of the resin body, e.g., connecting to another similarly treated resin body, can be advantageously conducted by utilizing the exposed fibrous reinforcement.

13 Claims, 31 Drawing Figures

APPARATUS FOR EXPOSING FIBROUS REINFORCEMENTS OF FIBER REINFORCED RESIN BODY

The present invention relates to an apparatus for exposing the fibrous reinforcements of a fiber reinforced resin body (hereinafter abbreviated "RP body") by removing the resin matrix from a portion of the RP body.

RP bodies comprise a resin matrix of e.g., a polyester or epoxy and fibrous reinforcements such as rovings or clothes of glass fibers, carbon fibers or Aramid fibers, and thus have a high mechanical strength.

When connecting two RP bodies (e.g., RP plates) together, conventionally the two plates are brought into contact with each other end-to-end, and an RP connecting bridge is formed over the surfaces of the two plates to form a connection therebetween. However, since no fibrous reinforcements pass through the interfaces between the two plates and between the bridge and the two plates, the strength of the connection cannot be as high as the strength of the plates per se.

In order to provide a strengthened connection, it is conceivable to expose the fibrous reinforcements at the connecting ends of two RP plates by partly removing the resin matrix thereof and to overlap or entangle the exposed fibrous reinforcements of the two plates, the overlapped fibrous reinforcements thereafter being impregnated with and wraped by a resin to form a connection between the plates upon curing of the resin. However, since resins intended for RP bodies exhibit a high resistance against corrosion, it has been conventionally believed that there are no methods for removing the resin matrix of RP bodies.

It is therefore an object of the present invention to provide an apparatus for partially removing the resin matrix of an RP body to expose the inside fibrous reinforcements so that subsequent processing of the body can be advantageously conducted.

In one aspect, the present invention provides a method for exposing the fibrous reinforcements of an RP body comprising at least one stage in which a portion of the RP body is brought into contact with a heated resin removing liquid while the RP body is vibrated.

According to another aspect, the present invention provides an apparatus for exposing the fibrous reinforcements of an RP body comprising at least one processing unit in which a portion of the resin body is brought into contact with a heated resin removing liquid while the resin body is vibrated.

Figure 2:
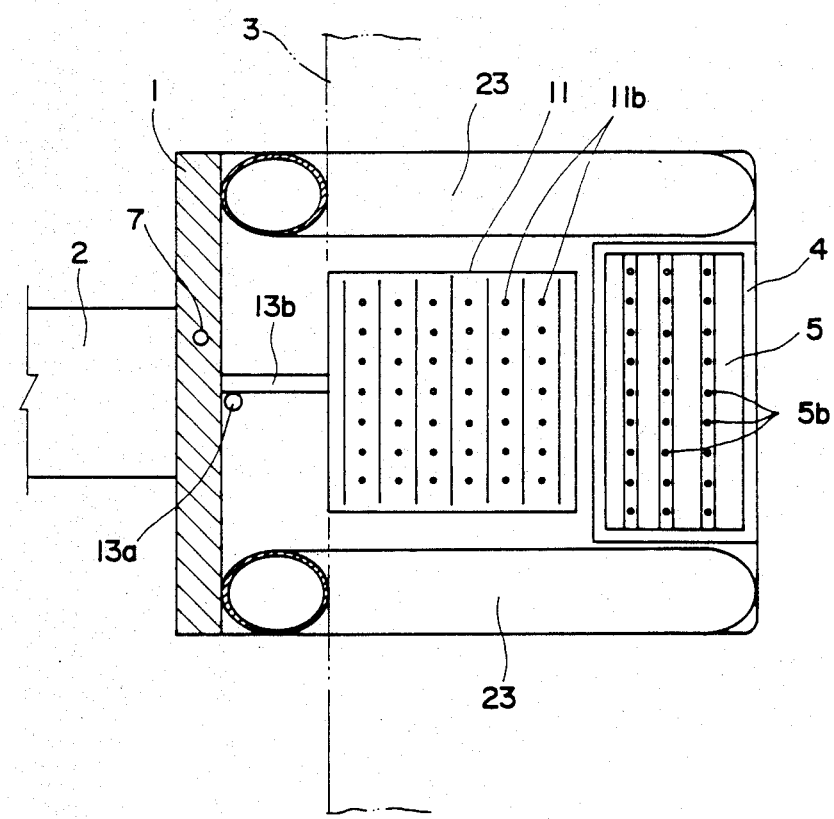
Figure 3:
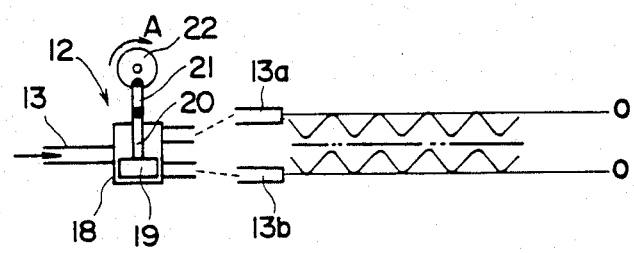
Figure 4:
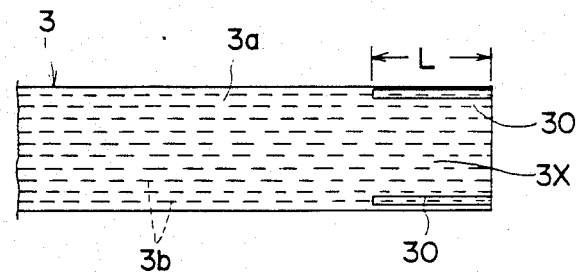
Figure 5:
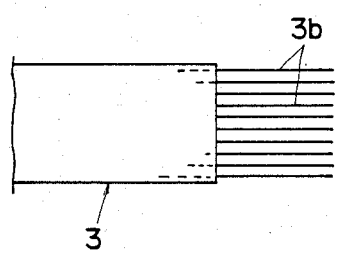
Figure 6:
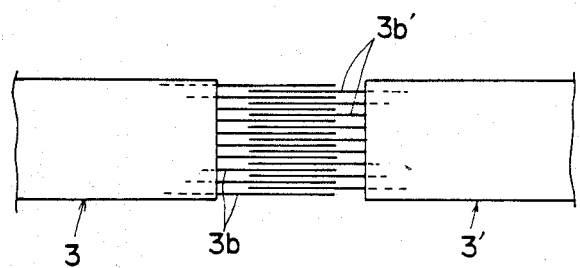
Figure 7:
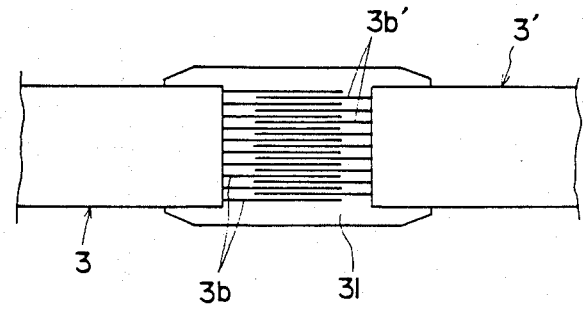
Figure 8:
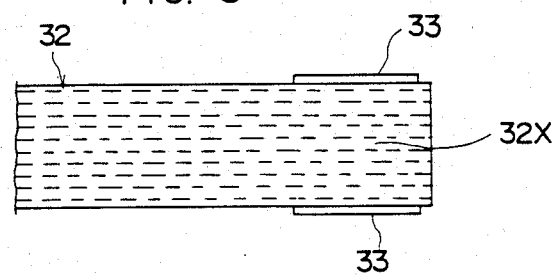
Figure 9:
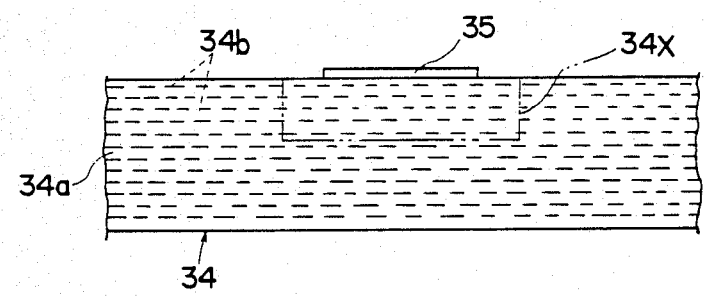
Figure 10:
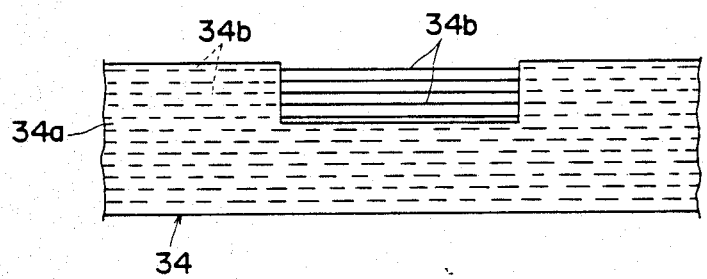
Figure 11:
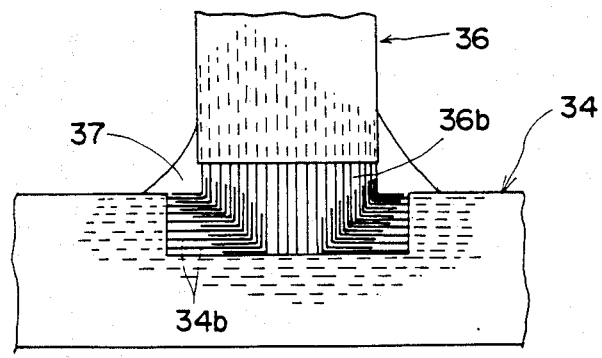
Figure 12:
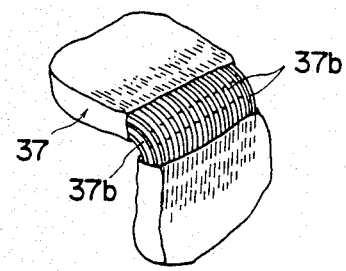
Figure 13:
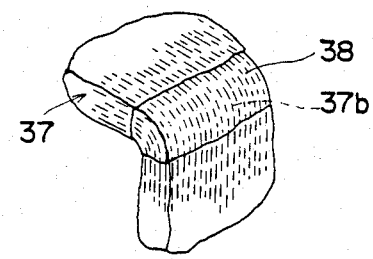
Figure 14:
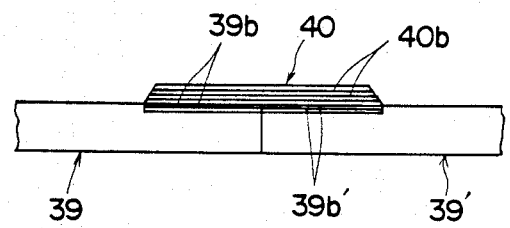
Figure 15:
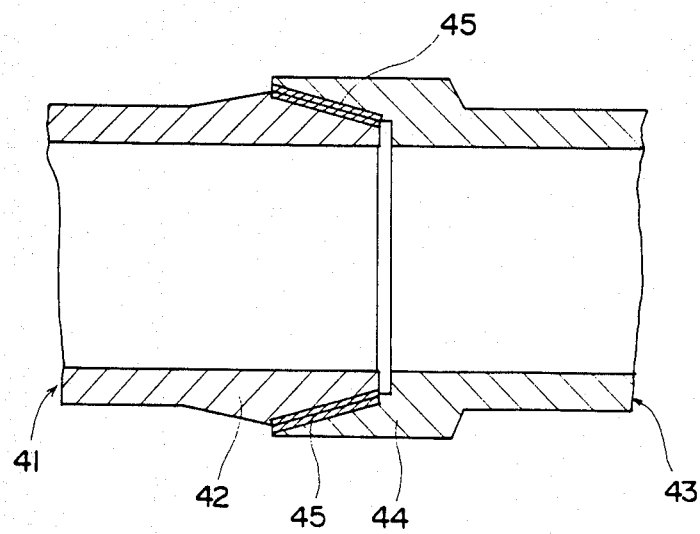
Figure 16:
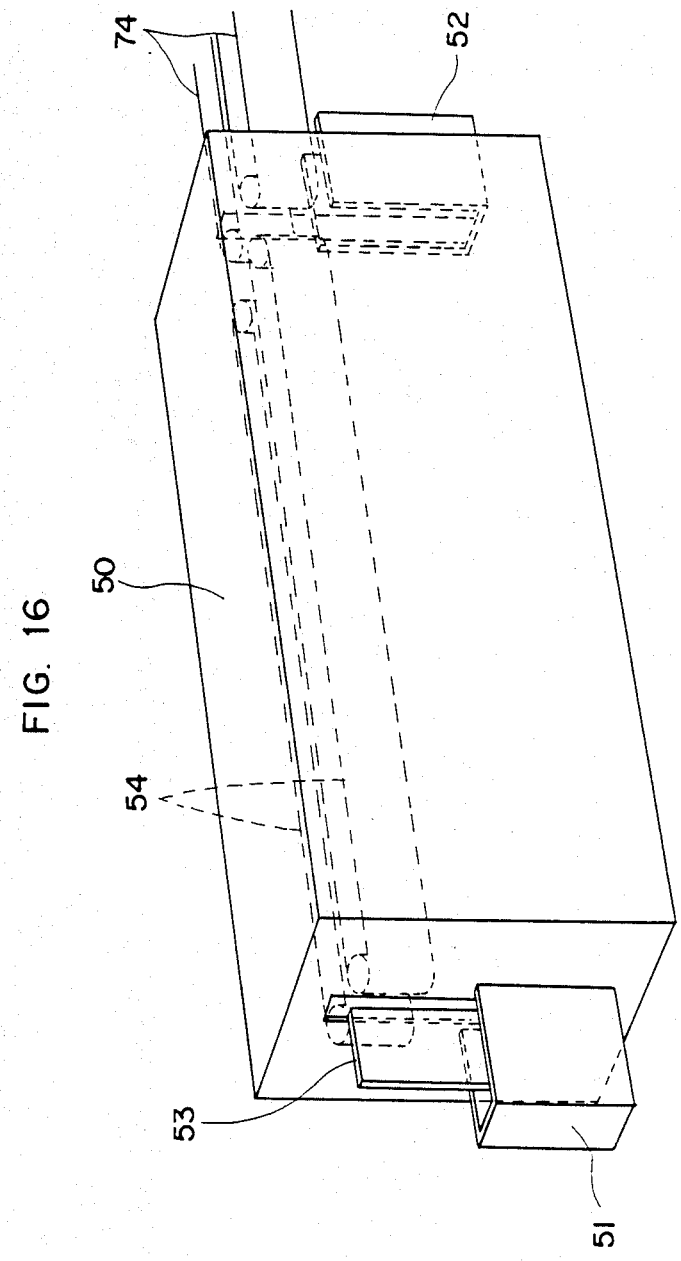
Figure 17:
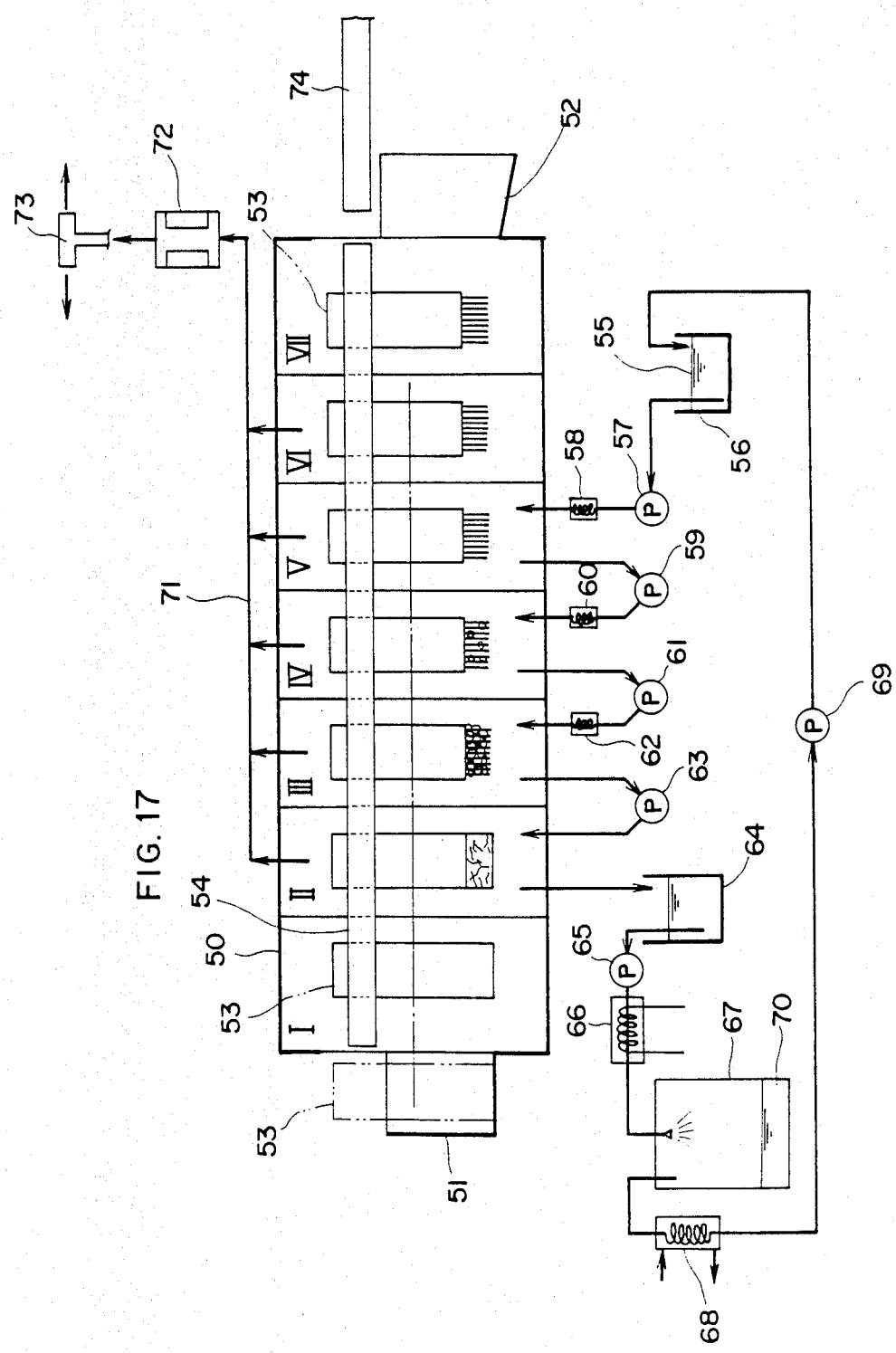
Figure 18:
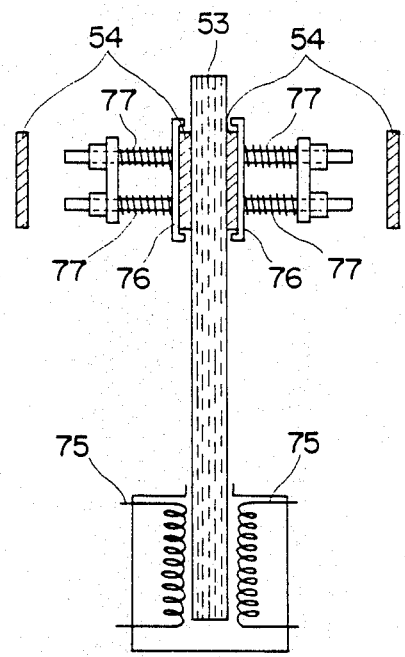
Figure 19:
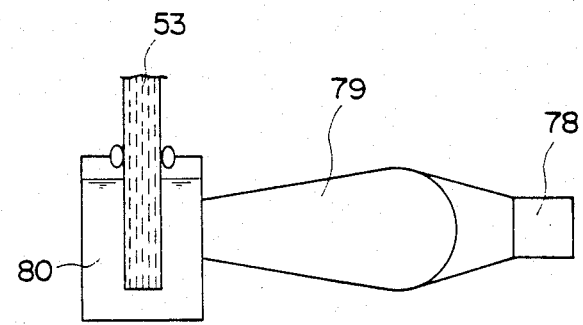
Figure 20:
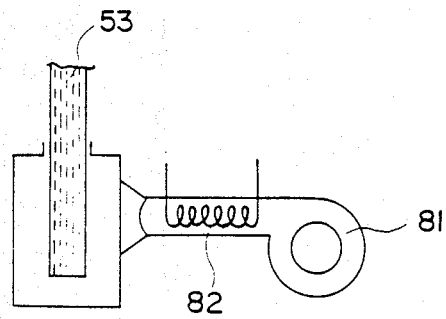
Figure 21:
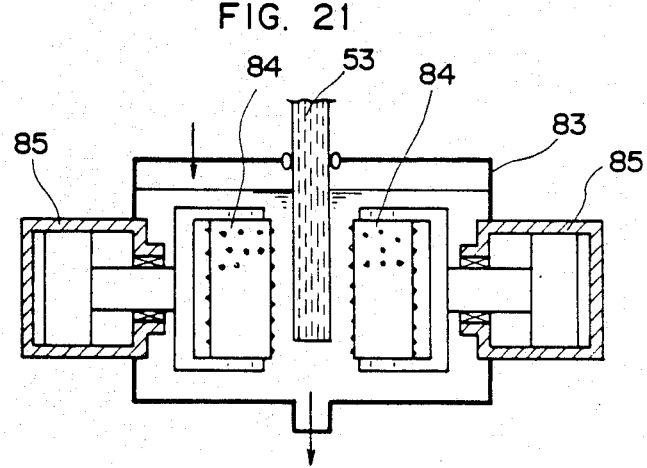
Figure 22:
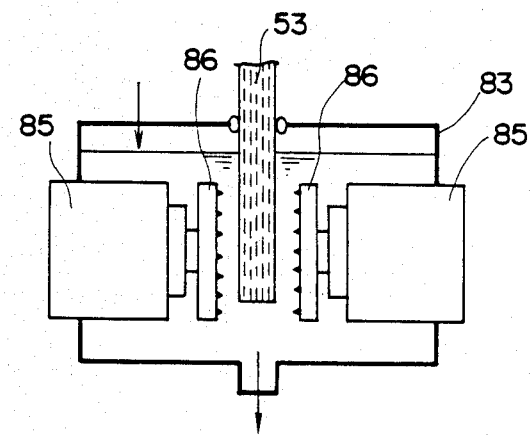
Figure 23:
Figure 24:
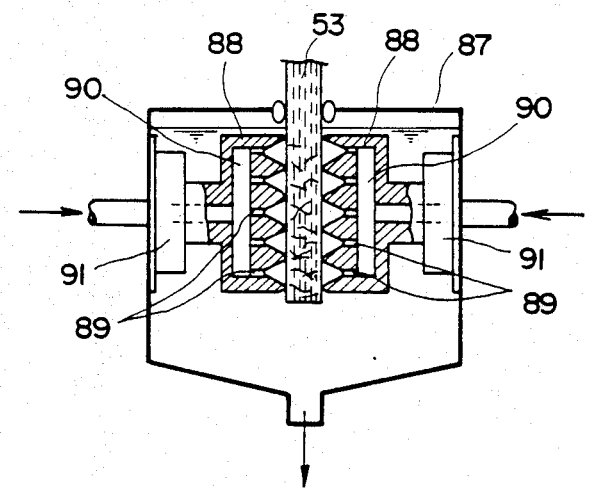
Figure 25:
Figure 26:
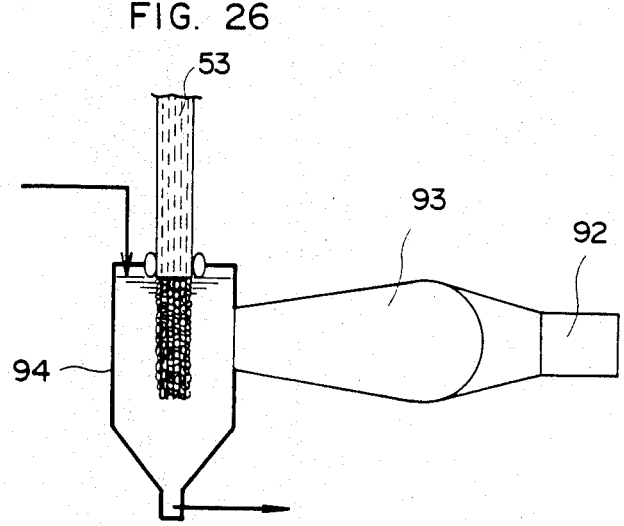
Figure 27:
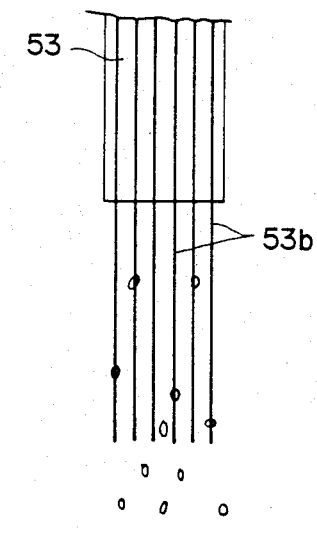
Figure 28:
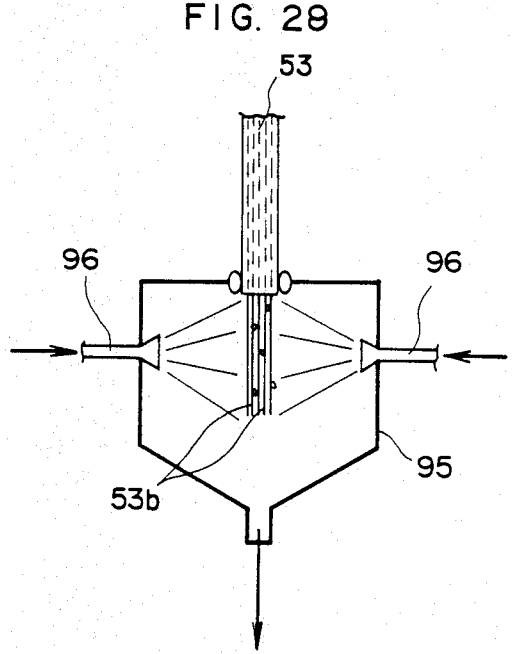
Figure 29:
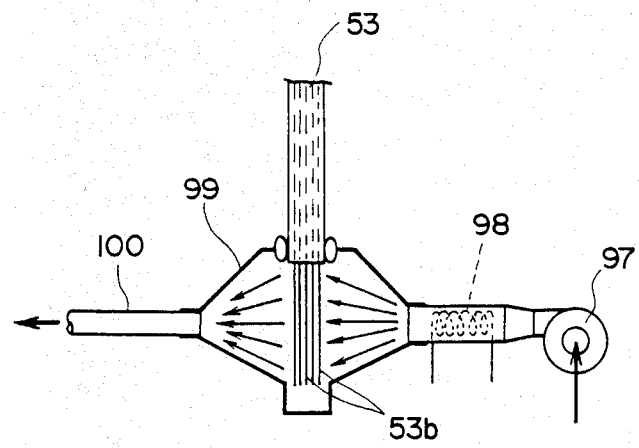
Figure 30:
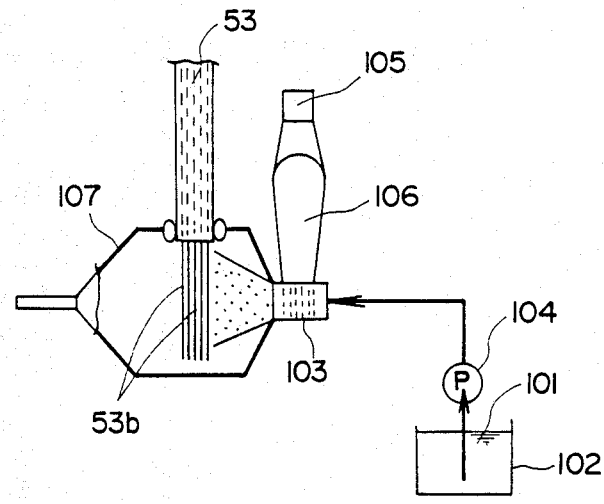
Figure 31:
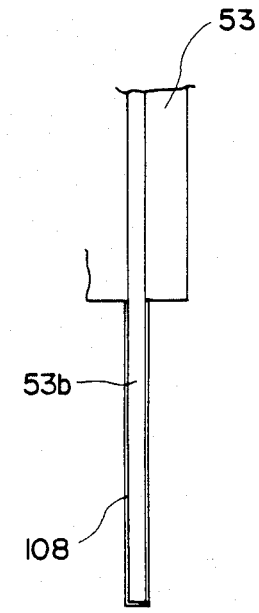

Various features and effects of the present invention will become more apparent from the following description of embodiments given with reference to the accompanying drawings, in which;

FIG. 1 is a side view in section of a reinforcement exposing apparatus embodying the invention, FIG. 2 is a sectional view of said exposing apparatus taken on line II—II in FIG. 1, FIG. 3 is a schematic view showing the switching device incorporated in the exposing apparatus of FIG. 1, FIG. 4 is a view showing an RP plate to which the exposing apparatus of FIG. 1 can be advantageously applied, FIG. 5 is a view showing the RP plate of FIG. 4 with the fibrous reinforcements thereof partially exposed, FIGS. 6 and 7 are views showing a method by which the reinforcement exposed plate of FIG. 5 is connected to another similarly treated RP plate, FIG. 8 is a view showing another RP plate to which the apparatus of FIGS. 1 to 3 can be advantageously applied, FIG. 9 is a view showing still another RP plate to which the apparatus of FIGS. 1 to 3 can be advantageously applied with some modifications, FIG. 10 is a view showing the RP plate of FIG. 9 with the fibrous reinforcements thereof partially exposed, FIG. 11 is a view showing the RP plate of FIG. 10 as connected to another RP plate similar to FIG. 5 in a T-shape, FIGS. 12 and 13 are views showing a method of bending an RP plate with the application of the present invention, FIG. 14 is a view showing another preferred type of end-to-end connection between two RP plates, FIG. 15 is a view showing a preferred spigot-socket connection between two RP pipes, FIG. 16 is a perspective view showing the overall picture of another reinforcement exposing apparatus embodying the invention, FIG. 17 is a schematic view showing the process flow of the exposing apparatus of FIG. 16, FIG. 18 is a schematic view showing one example of the first processing unit incorporated in the apparatus of FIG. 16, FIG. 19 is a schematic view showing another example of the first processing unit, FIG. 20 is a schematic view showing still another example of the first processing unit, FIG. 21 is a schematic view showing an example of the second processing unit incorporated in the apparatus of FIG. 16, FIG. 22 is a schematic view showing another example of the second processing unit, FIG. 23 is a view showing an RP plate which has been roughly or coarsely cracked in the second processing unit, FIG. 24 is a view showing an example of the third processing unit incorporated in the apparatus of FIG. 16, FIG. 25 is a view showing the RP plate of FIG. 24 after it has been minutely or finely cracked in the third processing unit, FIG. 26 is a schematic view showing an example of the fourth processing unit incorporated in the apparatus of FIG. 16, FIG. 27 is a view showing the RP plate of FIG. 25 after it has been subjected to ultrasonic cleaning in the fourth processing unit, FIG. 28 is a schematic view showing an example of the fifth processing unit incorporated in the apparatus of FIG. 16, FIG. 29 is a schematic view showing the sixth processing unit incorporated in the apparatus of FIG. 16, FIG. 30 is a schematic view showing the seventh processing unit incorporated in the apparatus of FIG. 16, FIG. 31 is a fragmentary view showing a fibrous reinforcement of the RP plate which has been coated with a bonding facilitating agent in the seventh processing unit.

Referring to FIGS. 1 to 3, a reinforcement exposing apparatus comprises a main body 1 of generally U-shape and a handle 2. The main body 1 has an open front end and open sides in order to allow lateral passage of an RP plate 3 consisting of a resin matrix 3a (e.g., polyester resin or epoxy resin) and fibrous reinforcements 3b (e.g., rovings or clothes of glass fibers, carbon fibers or Aramid fibers) embedded in the matrix 3a in laying up a lamination. The open front end of the main body 1 is provided with a pair of rectangular retaining projections 4 which retains a pair of opposed air jet seals 5. Each seal 5 has a waved surface adapted to slidably contact the plate 3 at the ridges 5a and is provided with air jetting orifices 5b at the furrows. The orifices 5b of each seal 5 communicates an air chamber 6 formed in the corresponding rectangular projection 4. Both air chambers 6 communicate an air pump 9 through conduits 7 and 8 extending in the main body 1 and the handle 2 and through the piping 10.

Within the main body 1 inwardly of the air jet seals 5 are arranged a pair of opposed liquid applicators 11. Each applicator 11 has a waved surface adapted to slidably contact the plate 3 at the ridges 11a and is provided with air jetting orifices 11b at the furrows, the orifices 11b communicating a liquid chamber 11c formed within the applicator 11. The liquid chambers 11c of both applicators 11 are connected to a switching device 12 via conduits 13a and 13b extending through the handle 2. The switching device 12 in turn is connected through a piping 13 to a pump 14 which supplies a resin removing liquid 15 under pressure from a liquid vessel 16. The liquid 15 in the vessel 16 is heated by heaters 17.

As best illustrated in FIG. 3, the switching device 12 comprises a cylinder 18 connected to the conduits 13a and 13b. A piston 19 having a piston rod 20 is guided in the cylinder 19, and the piston rod 20 is rotatably connected to a link 21 which in turn is rotatably connected to a rotor 22. Thus, when the rotor 22 rotates as indicated by the arrow A, the piston 19 moves up and down in the cylinder 18 to alternately open the conduits 13a and 13b.

Each open side of the main body 1 is provided with a U-shaped inflatable seal 23 which is connected to unillustrated air supply and withdrawal means.

The main body 1 is further provided with a discharge opening 24 which is connected to a discharge conduit 25 extending through the handle 2. The conduit 25 is connected to a piping 26 directed to the liquid vessel 16 and provided with a pressure reduction pump 27 and a filter 28.

The reinforcement exposing apparatus of the construction described above operates in the following manner.

With the handle 1 manually or mechanically held, the reinforcement exposing apparatus is moved laterally relative to the RP plate 3 with the plate 3 partially inserted into the U-shaped main body 1. The resin removing liquid 15 heated by the heaters 17 is pumped through the piping 13 to the switching device 12. The switching device 12 alternately delivers the heated liquid to the liquid chambers 11c through the respective conduits 13a and 13b. As a result, the heated liquid alternately jets out to the opposite surfaces of the plate 3 through the jetting orifices 11b so that while the plate 3 is vibrated by the alternately opposite jets of the liquid, the resin matrix 3a of the plate 3 is rapidly removed at the portion interposed between the liquid applicators 11 mainly by the dissolving action of the resin removing liquid. During this operation, the main body 1 is sealed frontwise by air jets through the orifices 5b of the air jetting seals 5 and sidewise by the inflatable seals 23. The resin removing liquid containing dissolved matrix resin and small resin solids (parts remaining unsolved) is drained through the piping 26 by the action of the pressure reduction pump 27 and fed back to the vessel 16 after being purified by the filter 28.

The resin removing liquid comprises a solvent or a mixture of a solvent and an eroding agent. Examples of the solvent include chlorine containing hydrocarbons (methylene chloride, chloroform, etc.), armatic compounds (benzene, toluene, etc.), non-protonic polar compounds (dimethylformamide, dimethyl sulfoxide, etc.), ketones (methyl ethyl ketone, acetone, etc.), and esters (methyl acetate, etc.), ethers (ethyl ether, etc.). Examples of the eroding agent include non-ionic compounds (polyoxyethyene alkyl ethers, polyoxyethylene alkylphenol ethers, etc.), anionic compounds (alkyl sulfuric ester salts, alkyl naphthalene sulfonates, etc.), and cationic compounds (quaternary ammonium salts, etc.).

The reinforcement exposing apparatus of FIGS. 1 to 3 is particularly suited for treating a RP plate of the type illustrated in FIG. 4. The illustrated RP plate 3 has an unset or incompletely set end portion (hereinafter referred to "UI" portion) 3X for a predetermined length L with the remaining portion being completely set.

According to the illustrated example, the plate 3 has embedded therein a pair of tapes 30 which are impregnated with a setting preventer. The tapes 30 can be incorporated in the plate 3 while the plate 3 is laminatingly formed. The UI portion 3X is formed by the polymerization preventing action of the setting preventer.

Each tape 30 may consist of a fibrous cloth (cotton fibers, acrylic fibers, etc.), or of a polymer film (polyvinyl alcohol, polyamide, polyester, cellophane, etc.) or of a paper sheet.

Alternatively, the setting preventer may be contained in the plate 3 by directly spraying it while the plate 3 is laminatingly formed.

In the case of using a polyester to form the resin matrix of an RP body, the setting preventer serves as a reaction inhibitor and/or a reaction retarder and/or a radical scavenger. Examples include quinones (hydroquinone, benzoquinone, chloranil, etc.), nitro-compounds (trinitrotoluene, 2,2-diphenyl-1-picrylhydrazyl, etc.), anionic oxides, diphenylpicryl, hydrazyl, iron chloride, and iodine.

On the other hand, in the case of using an epoxy resin hardenable by the cross-linking action of a curing agent to form the matrix of an RP body, the setting preventer may comprise a compound of a first type which has a single functional group reactable with the epoxy groups (epoxides) of the epoxy resin at a higher rate and yield than the reaction between the expoxy resin and the curing agent or a compound of a second type which has a single functional group reactable with the cross-linking functional groups (amino groups) of the curing agent at a higher rate and yield than the raction between the epoxy resin and the curing agent. Examples of the first type include aliphatic dialkyl amines, alkoxy anions, thioalkoxy anions. Examples of the second type include mon-functional epoxy compounds (glycidyl ethers, glycidyl esters, epichlorohydrine, glycidol, etc.), mono-functional thioepoxy compounds, and mono-functional carboxylic acids.

It is to be noted that the setting or curing of an RP body can also be prevented locally by maintaing a portion of the RP body below polymerization temperature or by controlling other conditions required for polymerization.

Returning to FIG. 4, the RP plate 3 having the UI portion 3X is particularly suited for the reinforcement exposing treatment by the apparatus of FIGS. 1 to 3. More specifically, the resin matrix 3a in the UI portion is uncured or incompletely cured and thus readily removable by a resin removing liquid.

FIG. 5 illustrates the RP plate 3 after the fibrous reinforcements 3b are exposed.

As shown in FIG. 6, the exposed fiber reinforcements 3b of the RP plate 3 are overlapped with the similarly exposed fiber reinforcements 3b' of another RP plate 3'. Subsequently, a resin connector 31 is formed to wrap the overlapped fibrous reinforcements 3a and 3b', as shown in FIG. 7. As a result, there is formed a connection between the two plates 3 and 3' upon curing of the resin connector 31, the connection being as strong as the plates 3 and 3' per se.

FIG. 8 shows an RP plate 32 having a UI portion 32X formed by attaching a pair of setting preventer tapes 33 on both sides immediately after the formation of the plate 32.

When a setting preventer tape 35 is attached to one side of an RP plate 34 as illustrated in FIG. 9, a UI portion 34X is formed which extends halfway across the thickness of the plate 34. The resin matrix 34a at the UI portion 34X can be removed by the application of jets of a heated resin removing liquid to locally expose the fibrous reinforcements 34b. It is to be noted in this connection that jets of a heated resin removing liquid in one direction can cause vibration of the plate 34 due to strong impingement of the liquid jets on the plate 34.

FIG. 10 illustrates the RP plate 34 with the fibrous reinforcements 34b locally exposed. The exposed reinforcements 34b are cut in the middle and overlapped with the exposed fibrous reinforcements 36b of a second RP plate 36. Subsequently, a resin connector 37 is formed by applying a resin liquid to the overlapped reinforcements 34b and 36b. As a result, a strong T-shape connection is formed between the two plates 34 and 36.

FIGS. 12 and 13 show a manner in which a bend is formed in a straight RP plate. More specifically, an intermediate portion of the straight plate 37 is first subjected to matrix removal across the entire thickness thereof so that the fibrous reinforcements 37b are exposed at said intermediate portion. Subsequently the intermediate portion of the plate 37 is bent and filled with a liquid resin to form a bent resin connector 38.

Referring to FIG. 14, two RP plates 39 and 39' respectively having exposed fiber reinforcements 39b and 39b' at one ends on one side are brought together end-to-end. Thereafter an RP bridge 40 is formed over said one ends of the two plates 39 and 39' by laying up with the use of the exposed reinforcements 39b and 39b', additional fiber reinforcements 40b and a liquid resin. The RP bridge 40 which incorporates the fiber reinforcements 39b and 39b' of the two plates 39 and 39' provides a strong connection between the two plates 39 and 39'.

As shown in FIG. 15, the present invention can also be utilized to connect a first RP pipe 41 having a spigot 42 and a second RP pipe 43 having a socket 44 by a resin connector 45 incorporating the fiber reinforcements at the outer periphery of the first pipe spigot 42 and the inner periphery of the second pipe socket 44.

FIGS. 16 and 17 show another reinforcement exposing apparatus of the present invention which is particularly suited for treating an RP plate having its entirety completely set. The apparatus comprises a casing 50 provided with an intake receiver 51 and a take-out guide 52. RP plates 53 are placed in the receiver 51 one after another by unillustrated handling means. Each RP plate 53 is successively transferred by a pair of conveyor belts 54 through first to seventh processing units I–VII while being subjected to various treatments. After all the treatments the plate 53 is taken out by a pair of conveyor belts 74 through the take-out guide 52.

A purified resin removing liquid 55 stored in a storage tank 56 is supplied by a pump 57 into the fifth processing unit V through a heater 58. The liquid discharged from the fifth processing unit V is fed by a pump 59 into the fourth processing unit IV through a heater 60. The liquid discharged from the fourth processing unit IV is supplied by a pump 61 into the third processing unit III through a heater 62. The liquid discharged from the third processing unit III is supplied into the second processing unit II by a pump 63. The liquid in the second processing unit II is discharged into a collecting tank 64. The liquid in the tank 64 containing dissolved resin and small undissolved resin solids is supplied to a purifying tank 67 by a pump 65 after being evaporated by an evaporator 66, so that resin components are separated out as indicated at 70. The vapour from the tank 67 is returned to a liquid state by a heat exchanger 68 and fed back to the storage tank 56 by a pump 69.

Part of the resin removing which evaporates as a result of the treatments in the second to sixth processing units II–VI is taken out through a piping 71 and burnt by a burner 72. Indicated at 73 is a smokestack.

Next the specific arrangement and function of each processing unit will be described in detail.

As shown in FIG. 18, the first processing unit I comprises a pair of opposed heaters 75 between which is passed each RP plate 53 by the pair of conveyor belts 54. The conveyor belts 54 are pressed against an upper portion of the plate 53 by a pair of presser plates 76 biased by springs 77 (This pressing support mechanism is also employed in the subsequent processing units II–VII.). A lower portion of the RP plate 53 is heated by the heaters so as to soften the lower portion and to cause thermal stress in the lower portion.

Alternatively, the first processing unit I may comprise a combination of an ultrasonic generator 78 and a directing horn 79 as illustrated in FIG. 19. In this case the lower portion of the plate 53 is supersonically heated via a liquid heat carrier 80 (oils, melted solder, melted bismuth, etc.).

FIG. 20 shows another alternative arrangement for the first processing unit I. According to this arrangement, the lower portion of the plate 53 is heated by the hot air passed through a heater 82 by a blower 81.

The second processing unit II shown in FIG. 21 comprises a tank 83 into which the resin removing liquid is supplied by the pump 63 (see FIG. 17) from the subsequent processing unit III. The lower portion of the plate 53 is immersed in the liquid within the tank 83. A pair of roller presses 84 having engaging projections over the circumferential surfaces thereof engage both sides of the plate lower portion. Each roller press 84 is vibrated by a hydraulic vibrator 85. The roller presses 84 may be replaced by a pair of plate presses 86 shown in FIG. 22. The plate lower portion, which has been softened and thermally stressed in the first processing unit I, is roughly or coarsely cracked in this second processing unit II by the engagement of the plate 53 with the press projections and by the vibrational energy imparted by the hydraulic vibrators 85 as shown in FIG. 23.

The third processing unit III illustrated in Fig.24 comprises a pair of plate presses 88 arranged in a tank 87 and adapted to engagingly hold the coarsely cracked lower portion of the plate 53 therebetween. Each press 88 has liquid jetting orifices 89 communicating a liquid chamber 90 formed within the press 88 and is vibrated by a vibrator 91. The resin removing liquid from the subsequent processing unit IV is supplied under high pressure by the pump 61 (see FIG. 17) to the liquid chambers 90 of the respective presses 88 after being heated by the heater 62 (see FIG. 17). In this third processing unit III the plate lower portion is finely or minutely cracked by the vibrational energy imparted by the vibrators 91 and the high pressure jets of the heated resing removing liquid through the orifices 89 as illustrated in FIG. 25.

The finely cracked lower portion of the plate 53 is ultrasonically cleaned in the fourth processing unit IV which, as shown in FIG. 26, comprises a combination of a ultrasonic generator 92 and a directing horn 93. The ultrasonic energy given by the generator 92 is transmitted to the plate lower portion via the resin removing liquid supplied by the pump 59 (see FIG. 17) from the subsequent processing unit V into a tank 94 after being heated by the heater 60 (see FIG. 17). Naturally, the resin removing liquid also participates in the washing of the plate lower portion due to its dissolving action. As a result, the fibrous reinforcements 53b of the plate 53 is substantially exposed at the lower portion as shown in FIG. 27.

The fifth cleaning unit V illustrated in FIG. 28 comprises a pair of spray nozzles 96 arranged on a tank 95 and adapted to spray toward the lower portion of the plate 53 the purified resin removing liquid supplied by the pump 57 (see FIG. 17) from the storage tank 56 (see FIG. 17) after being heated by the heater 58 (see FIG. 17). After the shower cleaning in this processing unit V, small resin solids remaining on or between the exposed fiber reinforcements 53b are completely washed away.

The sixth processing unit VI shown in FIG. 29 comprises a combination of a blower 97 and a heater 98. The air fed by the blower 97 is heated by the heater 98. The hot air thus produced is directed toward the exposed fiber reinforcements 53b of the plate 53 to evaporate the resin removing liquid remining on the reinforcements 53b within a container 99. The vapor laden hot air is guided through a duct 100 to the piping 71 (see FIG. 17).

In the final processing unit VII shown in FIG. 30, a liquid coupling material 101 (e.g., silanes) stored in a tank 102 is supplied to screens 103 by a pump 104. The screens 103 are ultrasonically vibrated by a combination of a ultrasonic generator 105 and a directing horn 106. Thus, the supplied coupling material is atomized into a container 107 by passing through the ultrasonically vibrated screens 103 and deposited on each exposed fibrous reinforcement 53b to form a coating 108 as shown in FIG. 31. This coating 108 enhances bondability or affinity to a resin material used to form a resin connector between the RP plate 53 and another RP plate.

Although the reinforcement exposing apparatus of FIGS. 16 and 17 has been described as particularly suited for RP plates of the wholy cured type, it is also applicable to RP plates of the locally uncured (incompletely cured) type. Similarly, the apparatus of FIGS. 1 to 3 is also applicable to RP plates of the wholly cured type provided that a longer time is spent on removing a resinous matrix.

The present invention can be most advantageously used to construct large or small structures (ships, aircrafts, etc.) requiring complicated shapes, i.e., many connections and bends.

The present invention is not limited to the illustrated embodiments, but can be modified in various ways by those skilled in the art within the scope defined in the appended claims.

What is claimed is:

1. An apparatus for exposing and cleaning the fibrous reinforcements of a fiber reinforced resin body comprising at least one processing unit including, a generally U-shaped main body with an open front end and open sides for laterally movably receiving an edge portion of the resin body, a pair of opposed liquid applicators arranged in the main body on both opposite walls thereof and adapted to slidably contact both sides of said edge portion of the resin body, each applicator having liquid jetting orifices on the side thereof opposing the other applicator, and means for alternately supplying a heated resin removing liquid to the applicators so that the liquid is jetted to said edge portion of the resin body alternately through the orifices of the respective applicators to cause the resin body to vibrate.

2. An apparatus as defined in claim 1 wherein the supplying means includes a switching device comprising a cylinder adapted to receive the liquid under pressure and connected to conduits leading to the respective applicators, a piston having a piston rod and reciprocally movable within the cylinder to alternatively open the conduits, and a rotor connected through a link to the piston rod to reciprocate the piston.

3. An apparatus as defined in claim 1 wherein the open front end of the main body is provided with a pair of opposed air jet seals adapted to slidably contact both sides of the resin body and each having on the side thereof opposing the other seal a waved surface provided at a furrow thereof with air jetting orifices communicating a pressurized air supply source, and each open side of the main body being provided with a U-shaped inflatable seal.

4. An apparatus as defined in claim 1 wherein said side of each applicator has a waved surface provided at the furrows thereof with said liquid jetting orifices.

5. An apparatus for exposing and cleaning the fibrous reinforcements of a fiber reinforced resin body comprising, a first processing unit having means for heating a portion of the resin body, a second processing unit having first vibrator press means for roughly or coarsely cracking said portion of the resin body in a resin removing liquid, a third processing unit having second vibrator press means and means for jetting a heated resin removing liquid to said portion of the resin body so that said portion of the resin body is minutely or finely cracked, a fourth processing unit having ultrasonic cleaning means for roughly washing off the cracked resin matrix from said portion of the resin body in a heated resin removing liquid, a fifth processing unit having means for applying to said portion of the resin body a shower of a heated purified resin removing liquid so as to completely wash off the remaining cracked resin matrix, and means for transporting the resin body through said processing units.

6. An apparatus as defined in claim 5, wherein said first vibrator press means comprises a first pair of opposed vibrator presses each having engaging projections adapted to engage a corresponding side of said resin body portion for mechanically cracking said portion.

7. An apparatus as defined in claim 6 wherein each vibrator press means comprises a press roller having said engaging projections on the circumferential surface thereof and a vibrator connected to each press roller.

8. An apparatus as defined in claim 6 wherein each vibrator press means comprises a press plate having said engaging projections on the side thereof opposing the press plate of the other vibrator press means and a vibrator connected to each press plate.

9. An apparatus as defined in claim 5 wherein said second vibrator press means is provided with a second pair of opposed vibrator presses between which is passed the mechanically cracked resin body portion and means for jetting said resin removing liquid to said resin body portion.

10. An apparatus as defined in claim 9 wherein each second vibrator press comprises a second press plate having a waved surface on the side thereof opposing the second press plate of the opposing second vibrator press, and said jetting means comprises liquid jetting orifices formed at the furrows of each waved press plate surface.

11. An apparatus as defined in claim 5 further comprising a sixth processing unit for drying the exposed fibrous reinforcements of the resin body by a stream of heated air.

12. An apparatus as defined in claim 11 further comprising a seventh processing unit having means for applying an atomized liquid coupling material on the exposed fibrous reinforcements of the resin body to form a coating of the coupling material on each exposed reinforcement.

13. An apparatus as defined in claim 12 wherein the coupling material applying means comprises a screen through which a stream of the coupling material is passed and means for ultrasonically vibrating said screen.

* * * * *